Feb. 8, 1949. J. F. OSTERHAUS 2,461,391
DRIVE TRANSMISSION FOR GARDEN TRACTORS
Filed Jan. 7, 1946 2 Sheets-Sheet 1

Inventor
JOSEPH F. OSTERHAUS

By *Clarence A. O'Brien and Harvey B. Jacobson*
Attorneys

Feb. 8, 1949.  J. F. OSTERHAUS  2,461,391
DRIVE TRANSMISSION FOR GARDEN TRACTORS
Filed Jan. 7, 1946  2 Sheets-Sheet 2
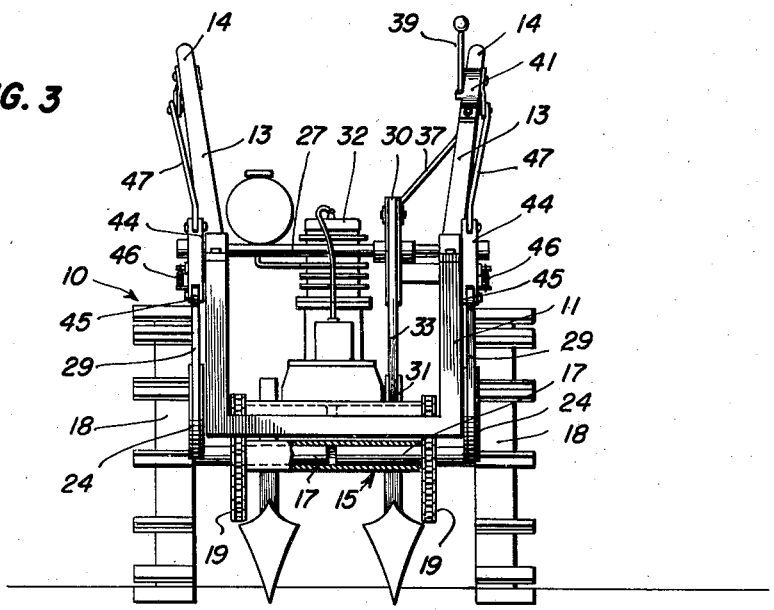
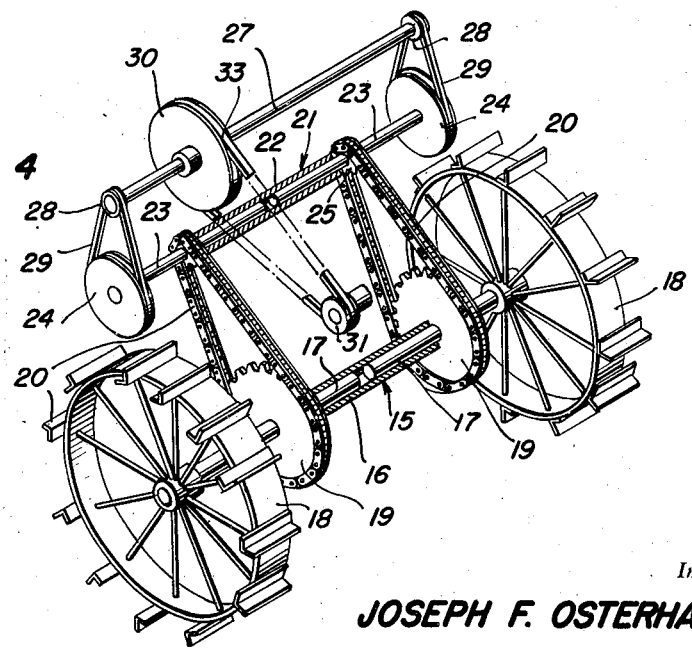
Inventor
JOSEPH F. OSTERHAUS
By *Clarence A. O'Brien*
*and Harvey B. Jacobson*
Attorneys Patented Feb. 8, 1949

2,461,391

UNITED STATES PATENT OFFICE 2,461,391

DRIVE TRANSMISSION FOR GARDEN TRACTORS

Joseph F. Osterhaus, Independence, Iowa

Application January 7, 1946, Serial No. 639,512

1 Claim. (Cl. 180—17)

This invention relates to a garden tractor and more particularly to the control mechanism thereof.

The primary object of the invention is to facilitate the handling of a garden tractor when both plowing and cultivating with the device.

Another object is to secure finger-tip control by the user of the tractor so that the device may be turned on a very short radius without requiring the removal of the hands from the handles of the tractor.

The above and other objects may be attained by employing this invention which embodies among its features a frame supported on a pair of ground wheels mounted for independent rotation, a prime mover mounted on the frame, drive means establishing driving connection between the prime mover and the ground wheels and means mounted on each handle of the tractor selectively to disengage one or the other ground wheels from driving connection with the prime mover.

Other features include means simultaneously to disengage both ground wheels from driving connection with the prime mover.

In the drawings:

Figure 3 is a front view in elevation showing portions of the device broken away to more clearly illustrate certain details of construction, and Figure 4 is a perspective view of the driving mechanism.

Figure 1:
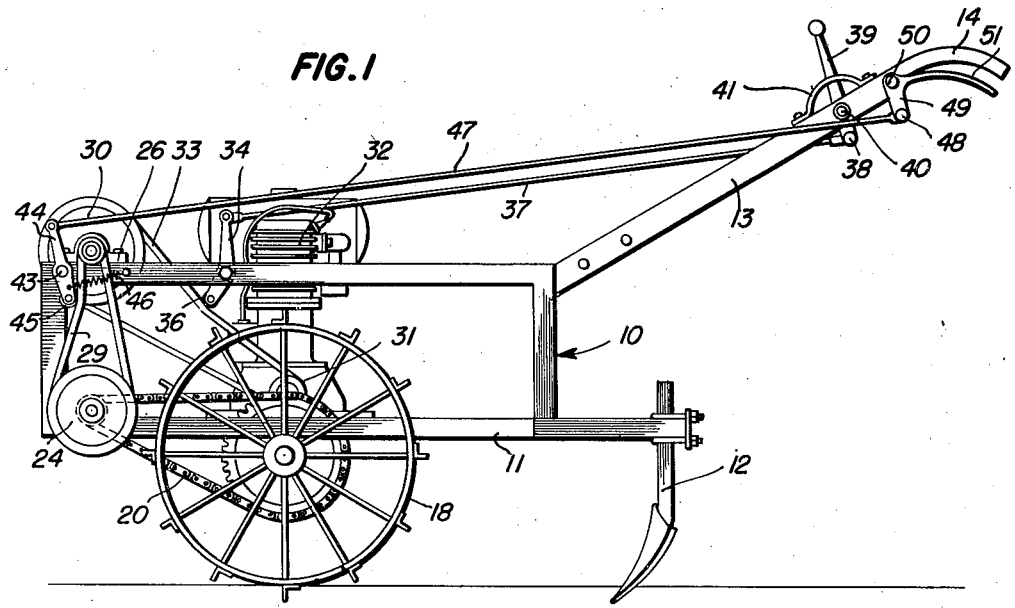
Figure 1 is a side view of a tractor embodying the features of this invention.
Figure 2:
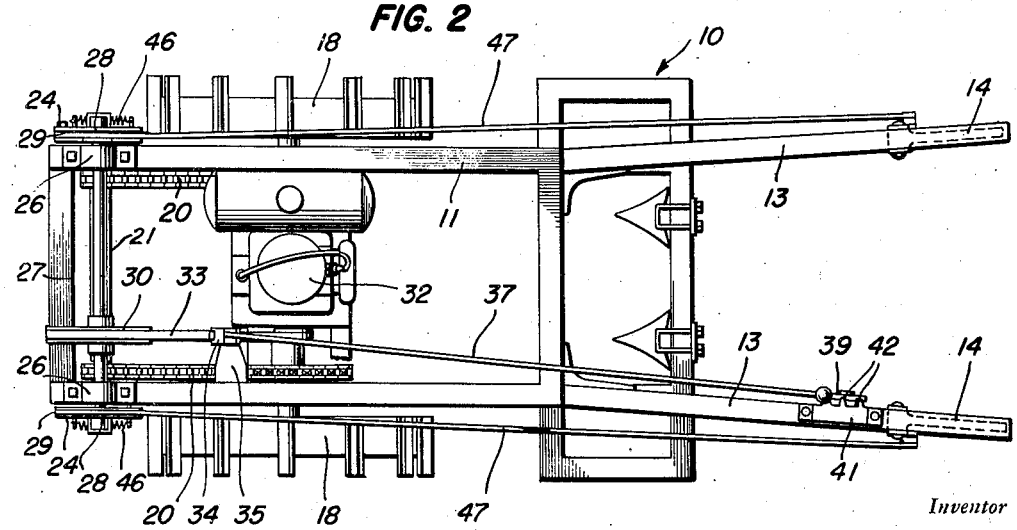
Figure 2 is a top plan view of Figure 1.

Referring to the drawings in detail a conventional garden tractor designated generally 10 comprises a frame 11 carrying the usual plows or cultivator implements 12 at its rear end, and rising from the frame adjacent its rear end is a pair of spaced handle-bars 13 carrying at their extreme upper ends hand-grips 14. Extending transversely of the frame 11 intermediate its ends is an axle shaft 15 which comprises a tubular member 16 in which stub shafts 17 are rotatably mounted. These stub shafts carry at their extreme outer ends traction or ground wheels 18 upon which the main weight of the tractor is supported. Attached to the axle shafts 17 adjacent the wheels 18 are drive sprockets 19 over which drive chains 20 are trained.

Extending transversely of the frame near its forward end is a jack shaft designated generally 21 which comprises a sleeve 22 in which independently rotatable shafts 23 are mounted. These independently rotatable shafts 23 carry adjacent their outer ends drive pulleys 24 and attached to the shafts 23 intermediate their ends are drive sprockets 25 over which the chains 22 run. It will thus be seen that driving connection is established between the respective wheels 24 and the ground wheels 18 on opposite sides of the tractor and when the drive pulleys 24 are rotated their respective traction wheels 18 will be driven.

Mounted in suitable bearings 26 on the frame 11 directly above the jack shaft 21 is a main drive shaft 27 carrying adjacent opposite ends drive pulleys 28 having driving connection with the pulleys 24 through the medium of endless belts 29. A drive pulley 30 is connected to the shaft 27 intermediate its ends and has driving connection with a drive pulley 31 on the main drive shaft of a suitable prime mover 32 which is mounted on the frame 11 directly above the axle 15 as will be readily understood upon reference to Figure 1. In the present instance, the prime mover 32 takes the form of an internal combustion engine such as is commonly employed on tractors of this character though it is to be understood that any suitable motive power may be employed. The driving connection between the pulley 30 and the drive pulley 31 of the prime mover 32 is established through the medium of a drive belt 33. The drive belts 29 and 33 loosely engage their respective pulleys so that no driving power will be transmitted to the traction wheels 18 until such time as the belts are placed under tension.

In order to establish driving connection between the prime mover 32 and the drive pulley 30 a lever 34 is pivotally supported on a bracket 35 carried by the frame 11 and one end of this lever carries a roller 36 which bears on the upper run of the belt 33. The opposite end of the lever 34 is connected by means of pull rod 37 which is pivotally connected as at 38 to one end of a hand lever 39 which is pivoted at 40 to one of the handle-bars 13 near its end grip 14. Supported on the handle-bar 13 in concentric relation with the pivotal motion of the lever 39 is a quadrant 41 which is provided with laterally extending fingers 42 which are adapted to engage the lever 39 and hold it in various adjusted positions. It will thus be seen that upon movement of the lever 39 the lever arm 34 will be rotated about its pivotal mounting on the bracket 35 so as to cause the roller 36 to be moved into and out of engagement with the upper run of the belt 33, to thus establish driving connection between the prime mover and the pulley 30.

Pivotally supported as at 43 on each side of the frame 11 is a lever arm 44, each of which carries a roller 45 which is adapted to engage the forward run of its respective belt 29. A retractile coil spring 46 is connected to each lever and the opposite end of said spring is attached to the frame 11 so as normally to urge the rollers 45 into contact with the belt 29 and establish driving connection between the pulleys 28 and 24. Connected to the upper free end of each lever 44 is a pull rod 47 the rear end of which is pivotally connected as at 48 to a lever 49 which is pivoted at 50 to its respective handle bar 13 adjacent the grip 14 thereon. The lever 49 is provided with a hand hold 51 which extends rearwardly in spaced relation to the hand grip 14 so as to be within easy reach of the operator. From the foregoing it will be seen that upon movement of the hand hold 51 toward the grip 14 pull will be exerted on the pull rod 47 so as to rock the lever 44 about its pivot and cause the roller 45 to move against the tension of the spring 46 to relieve the pressure on the front run of the belt 29 and thus disengage the respective traction wheels 18 from driving connection with the shaft 27.

In operation it will be understood that when a turn is to be made, for instance to the left, it is only necessary for the operator to engage the hand hold 51 on the left hand side of the tractor and move it toward its respective grip 14, thus relieving the tension on the belt 29 on the left side of the machine and consequently disengaging the left traction wheel 18 from driving connection with the prime mover 32. Obviously, upon so moving the lever 49 on the opposite side of the machine, a right hand turn may be made.

In starting the device the prime mover 32 may be set into motion with the hand lever 39 set so as to disengage the roller 36 from the upper run of the belt 33 and when it is desired to apply power to the traction wheels 18 it is only necessary to move the hand lever 39 in a direction to cause the lever 34 to move the roller 36 into belt tightening position on the belt 33.

From the foregoing it is obvious that a simple and efficient method of controlling the direction of movement of a garden tractor is thus provided and the controls are located in the immediate vicinity of the hand grips 14 so as to be readily accessible to the operator.

What I claim is:

In a garden tractor a frame, a tubular axle extending transversely of the frame intermediate its ends, a stub shaft rotatably mounted in each end of the tubular axle, a traction wheel on each stub shaft adjacent the end remote from the tubular axle, a drive sprocket on each stub shaft adjacent the tubular axle, a tubular supporting member extending transversely above the frame, a stub shaft mounted to rotate in each end of the supporting member, a drive sprocket on each stub shaft adjacent the supporting member having driving connection with the drive sprocket of the traction wheel on its respective side of the frame, a drive pulley on the end of each second mentioned stub shaft remote from the tubular supporting member, a main drive shaft extending transversely of the frame above the tubular support, a main drive pulley on said main drive shaft intermediate the ends thereof, a drive pulley on each end of the drive shaft, belts establishing driving connection between the drive pulley on the prime mover and the main drive pulley and manually controlled belt tighteners selectively to tighten the belts whereby one or the other traction wheel may be stopped or driven or both traction wheels may be stopped or driven in unison.

JOSEPH F. OSTERHAUS.

REFERENCES CITED

The following references are of record in the file of this patent:

UNITED STATES PATENTS

| Number | Name | Date |
| --- | --- | --- |
| 1,153,800 | Larkins et al. | Sept. 14, 1915 |
| 1,387,279 | Luger | Aug. 9, 1921 |
| 1,458,963 | Aultman | June 19, 1923 |
| 1,527,595 | McComb | Feb. 24, 1925 |
| 2,001,048 | Ziegler | May 14, 1935 |
| 2,015,587 | Bready | Sept. 24, 1935 |
| 2,133,512 | Herge | Oct. 18, 1938 |
| 2,329,372 | Hitch | Sept. 14, 1943 |